(12) United States Patent  
Herb

(10) Patent No.: US 7,996,977 B2
(45) Date of Patent: Aug. 16, 2011

(54) EYELET AND METHOD OF FORMING THE SAME

(75) Inventor: Armin Herb, Apfeldorf (DE)

(73) Assignee: Hilti Aktiengesellschaft, Schaan (LI)

( * ) Notice: Subject to any disclaimer, the term of this patent is extended or adjusted under 35 U.S.C. 154(b) by 1229 days.

(21) Appl. No.: 11/386,577

(22) Filed: Mar. 21, 2006

(65) Prior Publication Data

US 2006/0213050 A1    Sep. 28, 2006

(30) Foreign Application Priority Data

Mar. 22, 2005   (DE) .......................... 10 2005 000 023

(51) Int. Cl.
B23P 11/00    (2006.01)

(52) U.S. Cl. .............. 29/432.2; 29/509; 29/512; 29/514

(58) Field of Classification Search ............... 29/432, 29/432.1, 432.2, 505, 509, 512, 514, 521, 29/522.1, 524
See application file for complete search history.

(56) References Cited

U.S. PATENT DOCUMENTS

| | | | | |
|---|---|---|---|---|
| 1,252,289 A * | 1/1918 | Murray | ............ | 219/149 |
| 1,679,467 A * | 8/1928 | Dinsmoor | ............ | 292/314 |
| 2,321,755 A * | 6/1943 | Kost | ............ | 52/592.3 |
| 3,781,972 A * | 1/1974 | Enjolras et al. | ............ | 29/509 |
| 3,791,016 A * | 2/1974 | Eberhardt et al. | ............ | 29/432 |
| 4,306,511 A * | 12/1981 | Ashby et al. | ............ | 29/521 |
| 6,205,640 B1 * | 3/2001 | Dubugnon | ............ | 29/522.1 |
| 6,502,295 B1 * | 1/2003 | Morgand | ............ | 29/509 |
| 6,904,659 B1 * | 6/2005 | Plank | ............ | 29/432.1 |
| 6,918,170 B2 * | 7/2005 | Luthi | ............ | 29/509 |

FOREIGN PATENT DOCUMENTS

| | | |
|---|---|---|
| CN | 2600636 Y | 1/2004 |
| EP | 0579396 | 1/1994 |
| FR | 2426506 | 12/1979 |
| FR | 2752886 A1 | 3/1998 |

OTHER PUBLICATIONS

European Search Report.

* cited by examiner

*Primary Examiner* — David Bryant
*Assistant Examiner* — Christopher Koehler
(74) *Attorney, Agent, or Firm* — Abelman, Frayne & Schwab

(57) ABSTRACT

A stack arrangement has a first plate-shaped workpiece (12), at least one another plate-shaped workpiece, and an eyelet (14; 34) that connects the first workpiece (12) and the at least one another workpiece (13), with material of the first workpiece (12) being drawn through a through-opening (15) in the at least one another workpiece (13), and with a rim (17) of the through-opening (15) of the at least one another workpiece (13) conically narrowing in a direction of the first workpiece (12).

8 Claims, 7 Drawing Sheets

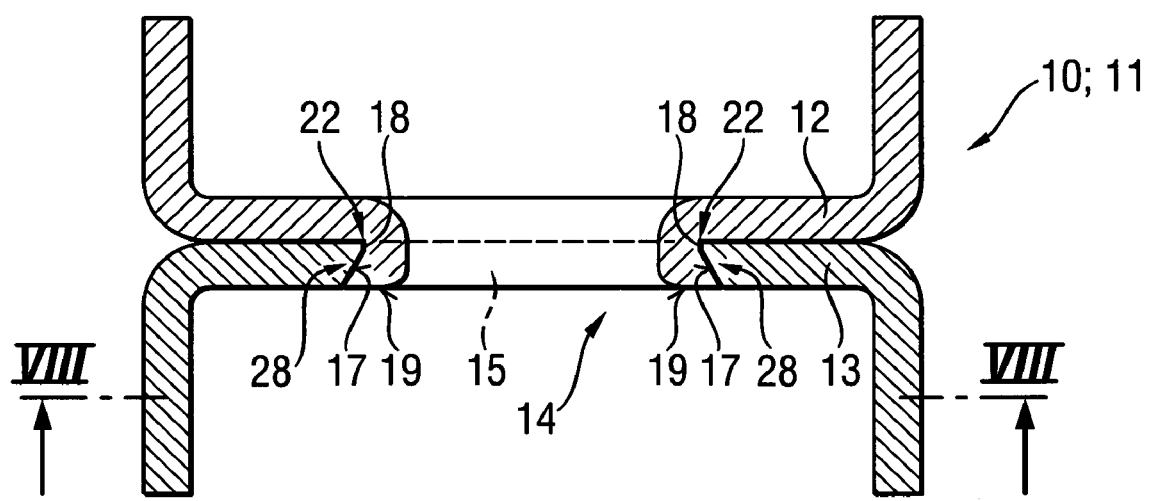

EYELET AND METHOD OF FORMING THE SAME

BACKGROUND OF THE INVENTION

1. Field of the Invention

The present invention relates to a stack arrangement having at least two workpieces, a first workpiece and at least one another workpiece, and connected by an eyelet, with the material of the first workpiece being drawn through a through-opening in the at least one another workpiece. The present invention also relates to a method of forming the eyelet that includes forming, with a piercing die, through-openings in the first workpiece and the at least one another workpiece, with the through-opening in the first workpiece having a cross-section smaller than the cross-section of the eyelet and with the through-opening in the at least one another workpiece having a cross-section greater than the cross-section of the eyelet and drawing, with a plunging die displaceable through the stack perpendicular thereto, material of the first workpiece through the through-opening in the at least one another workpiece.

2. Description of the Prior Art

German Utility Model DE 8632788 U1 discloses a stack of arranged one above another pre-formed flat parts connected with each other by an eyelet. The flat parts, before being riveted with each other, are separately provided, in a separate operational step, with openings. Upon arrangement of the parts at the site one upon another, the openings are arranged congruently with each other, with the opening in the outwardly located flat part adjacent to the plunging die being smaller than openings in the remaining parts. With the plunging die, the material of the flat part adjacent to the plunging die is drawn through the openings of other parts remote from the plunging die, with free rim of the eyelet being finally bent outwardly.

The drawback of the arrangement of DE 86 32788 U1 consists in that the flat parts should be provided separately with openings in precisely predetermined locations. Further, it should be preliminarily decided which flat part would be used for forming the eyelet. The disclosed method is rather complicated and error-prone.

German Patent DE 198 10 367 C1 discloses a method of forming an eyelet extendable through a stack of at least two plate-shaped workpieces, and according to which, a through-opening is formed in the stack before forming the eyelet, with the cross-section of the through-opening at most corresponding to the cross-section of the eyelet. Finally, a plunging die is displaced through the stack substantially perpendicular thereto, with the material of the workpiece adjacent to the plunging die being drawn through the through-opening of the workpiece remote from the plunging die. The inner profile of the opening substantially corresponds to the outer profile of the eyelet. With a single movement of the plunging die, both the eyelet and the opening in the workpiece remote from the plunging die, are formed. The workpiece remote from the die is so supported by a stamp that upon displacement of the plunging die out of the workpiece remote therefrom, a piece of material breaks off the remote workpiece. The outer profile of the material piece substantially corresponds to the outer profile of the eyelet. The free rim of the eyelet is flanged out outwardly.

The disclosed method of forming a riveting eyelet has proved itself. However, at a thickness of material above 3 mm, it hits against its limits. In addition, tension and transverse loads, which are produced according to this method, cannot be increased further.

An object of the present invention is a stack arrangement formed of at least two plate-shaped workpieces connectable with each other by an eyelet produced with a plunging die, and a method of forming the eyelet that enables connection of the workpieces independent of the thickness of material and transmission of large loads by the produced rivet joint.

SUMMARY OF THE INVENTION

This and other objects of the present invention, which will become apparent hereinafter, are achieved by providing a stack arrangement of the type described above in which the rim of the through-opening in the at least one another workpiece conically narrows in the direction of the first workpiece.

Upon breaking off of material piece, e.g., by tearing, from at least one another workpiece, there is formed a bevel that reduces the cross-section of the through-opening in the at least one another workpiece. The bevel forms, together with a substantially conical shape of the rim, an undercut of the material drawn through with the plunging die. Thereby, on one hand, a perfect rivet joint and, thus, a reliable connection of both workpieces with each other is produced. On the other hand, the transmission of a load by this connection is improved.

Furthermore, with a conical profile of the rim of the through-opening in the at least one another workpiece, there is provided a sufficient free space in which the drawn-through material can be received and which permits to obtain a flush, with surface, rivet joint or an offset backward rivet joint.

Advantageously, the rim of the through-opening in the at least one another workpiece has a fracture zone and an embossed zone. In the region of the embossed zone, the material is compacted, which enables a transmission of large loads. Preferably, the fracture zone of the rim of the through-opening in the at least one another workpiece extends circumferentially over the rim, so that a predetermined shape of the rivet joint is insured.

Advantageously, the rim of the through-opening in the at least one another workpiece has a stepped profile, which permits to achieve compactness of the rim region and which improves load transmission.

Advantageously, the rim of the through-opening in the at least one another workpiece has a plurality of separate indentations in which a larger portion of the drawn-through material of the first workpiece can be received. Thereby, the transmission of transverse loads and the shear strength are improved. Alternatively or in addition to the indentations, there are provided, on the rim of the through-opening in the at least one another workpiece, separate elevations between which a portion of the drawn-through material of the first workpiece can be received.

According to the invention, the method of forming an eyelet through a stack arrangement of at least two plate-shaped workpieces includes forming a fracture zone in the at least one another workpiece, forming, thereafter, with a piercing die in a single movement, a through-opening in each of the two workpieces, with the through-opening in the first workpiece having a cross-section smaller than a cross-section of the eyelet and with the through-opening in the at least one another workpiece having a cross-section greater than cross-section of the eyelet, and finally, drawing, with a plunging die displaceable through the stack perpendicular thereto, material of the first workpiece through the through-opening in the at least one another workpiece.

By embossing the fracture zone, a predetermined stub is produced, which permits to obtain a desired shape of a to-be-formed rivet joint. Thereby, the eyelet can have, in addition to known shapes, such as, circular opening or elongate opening, a complex geometry, such as, e.g., a rectangular opening, a key opening, or an opening with a polygonal profile. With the inventive method, the workpieces can be riveted with each other, independently from the thickness or type of material.

The piercing tool is formed, e.g., as a piercing die that stamps the through-opening in the first workpiece and that upon further movement, breaks off a material piece of the at least one another workpiece or tears the material piece off. Upon subsequent formation of the eyelet with the plunging die, no further material is broken off from the at least one another workpiece.

During embossing of the fracture zone, in addition, an embossed zone is formed, so that the rim of the through-opening in the at least one another workpiece remote from the plunging die conically narrows in the direction of the adjacent workpiece. Upon formation of the through-opening, in the at least one another workpiece, the fracture zone forms, in combination with the embossed zone, a through-opening-narrowing bevel that provides, upon the subsequent drawing of the material of the first workpiece, a partial undercut in the drawn-through material. This partial or regionwise undercut is already sufficient for transmission of loads at a reduced load level.

Advantageously, the fracture zone is formed as a circumferential notch, which enables a simple formation of a conical rim of the through-opening in the at least one another workpiece. This, in turn, simplifies formation of a definite embossed zone and improves transmission of transverse forces. Advantageously, the notch is provided, during the embossing process, with indentations. Thereby, regionwise, a greater amount of the drawn-through material can accumulate in the notch region, whereby the undercut is increased regionwise. The indentations, advantageously, face in the direction of the first workpiece and have, e.g., in plan view, a substantially rectangular shape or are formed as recessed or raised spikes. Alternatively or in addition to the indentations, the rim of the through-opening in the at least one other workpiece can be provided with separate elevations between which a portion of the drawn-through material of the adjacent workpiece can be received.

Advantageously, embossing is effected with a knife-edged ring which simplifies formation of a predetermined to-be-teared cross-section and insures formation of a predetermined shape. Advantageously, the knife-shaped ring has a stepped circumferential profile, so that the embossed zone has a stepped profile. Thereby, the rim of the through-opening in the at least one another workpiece becomes more compact, and the load transmission is improved.

Advantageously, the at least one another workpiece is supported during formation of the through-opening therein by a matrice or stamp. The matrice serves as a counter-support and prevents the at least one another workpiece from bending outwardly during formation of the through-opening and formation of the eyelet.

Advantageously, during formation of the eyelet, the material of the first workpiece is drawn through the through-opening of the at least one another workpiece only sectionwise. Thereby, the longitudinal sides of the eyelet rivet joint have interruptions, which improves the shear strength.

Advantageously, after the formation of the eyelet, the free ends of the material of the first workpiece, which extend past the rim of the through-opening of the at least one another workpiece are pressed backward to provide a flush-with-the-surface rivet joint. During the backward formation, the space between the conical rim of the through-opening in the at least one another workpiece and the outer profile of the drawn-through material is filled with the drawn-through material. If the embossed zone has indentation, they also will be filled upon backward deformation of the free ends. This substantially increases the load carrying ability in the direction transverse to the eyelet. alternatively, the free ends of the drawn-through material can be flanged outwardly, whereby the rim of the through-opening in the remote workpiece is provided with a collar.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 1 a cross-sectional view of arrangement of two plate-shaped workpieces according to the present invention;

FIG. 4 a bottom view of an embossing viewed from plane IV-IV in FIG. 2a;

DETAILED DESCRIPTION OF THE PREFERRED EMBODIMENTS

Figure 2A:
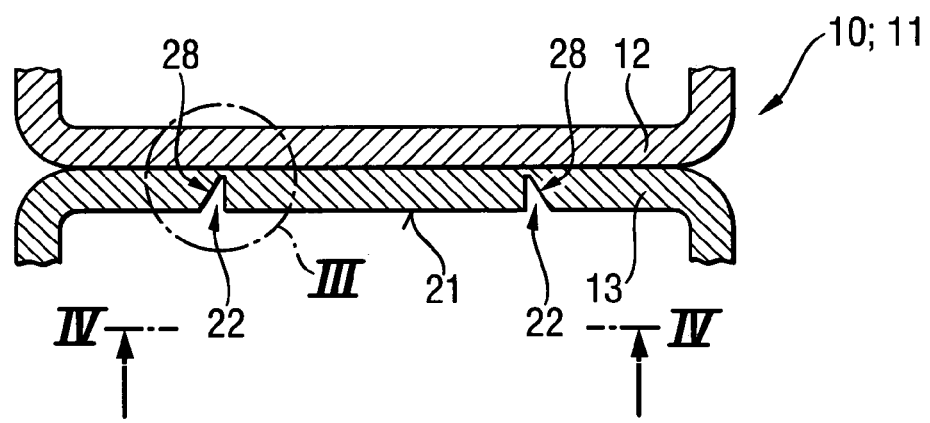
FIG. 2a-2d cross-sectional views illustrating four separate steps of the inventive method.
Figure 2B:
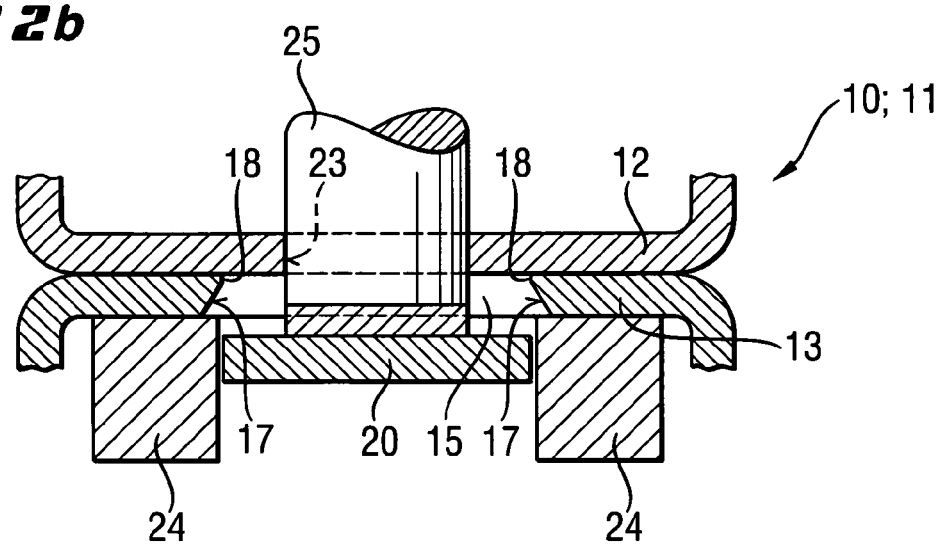

Two plate-shaped workpieces 12, 13 of the arrangement 11, which is shown in FIG. 1, are formed as U-shaped rails riveted with each other by an eyelet 14. To this end, the material of the first workpiece 12, which is adjacent to the plunging die 26 (FIG. 2c), is drawn through a through-opening 15 of the second workpiece 13 remote from the plunging die 26. The rim 17 of the through-opening 15 of the workpiece 13 has a fracture zone 22 and an embossed zone 28 and tapers conically in the direction of the first workpiece 12 which is adjacent to the plunging die 26. The rim 17 has a tip 18 that narrows the through-opening 15. The tip 18 is formed upon breaking off of a material piece 20, as it would be discussed further below. The free end 19 of the drawn-through material is so deformed back that a flush with the surface, rivet joint is formed.

A method of forming the eyelet 14 according to the present invention will be described below with reference to FIGS. 2a-2d. FIG. 2a shows a stack 10 formed of the two plate-shaped workpieces 12, 13. In a first step, on the back side 21 of the workpiece 13 remote from the plunging die 26, a fracture zone 22 and an embossed zone 28 are embossed with a knife-edged ring, not shown. The knife-edged ring can have a stepped outer profile, so that the rim 17 of the through-opening 15 in the workpiece 13 and, in particular, the embossed zone 28 (see FIG. 3b) can be formed with a stepped profile.

When a through-opening 23 in the workpiece 12 adjacent to the plunging die 26 and a through-opening 15 in the workpiece 13 remote from the plunging die 26, are formed, the workpiece 13 is supported by a stamp 24 having essentially an inner profile that substantially corresponds to an outer profile of the to-be-formed eyelet 14. With a dorn, which is formed as a piercing die 25, in a single movement of the piercing die 25, the through-openings 23, 15 are formed in the stack 10, with the through-opening 23 being formed in the workpiece 12, and with the material piece 20 being broken off of the workpiece 13 for forming the through-opening 15. The rim 17 of the through-opening 15 of the second workpiece 13 has a conical, diminishing in the direction of the first workpiece 12, shape, with the tip 18 being formed automatically.

Figure 2C:
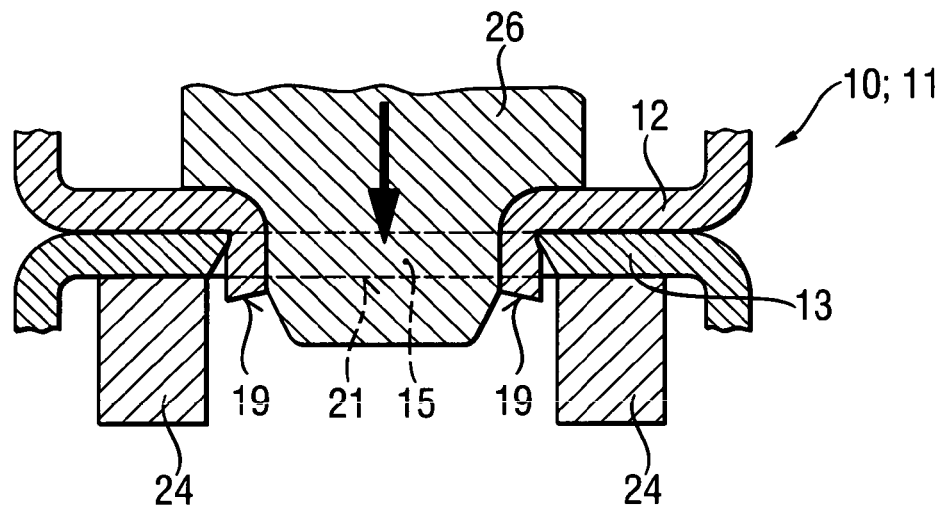
Figure 3A:
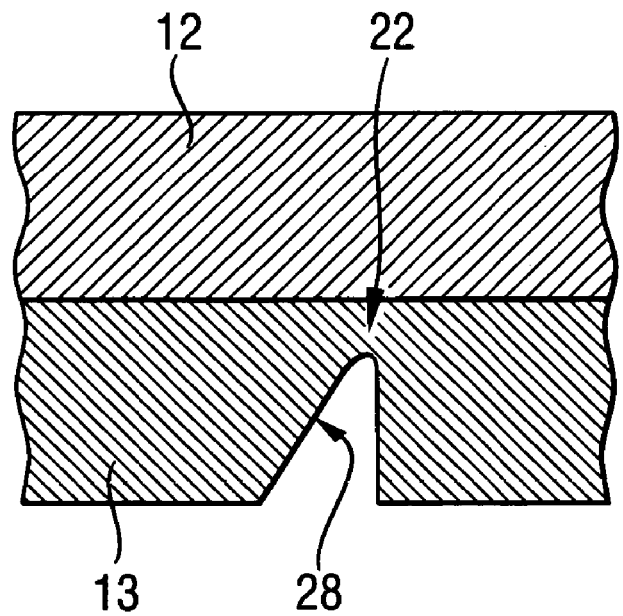
FIG. 3a a detailed view of region III in FIG. 2a at an increased, in comparison with FIG. 2a, scale.
Figure 3B:
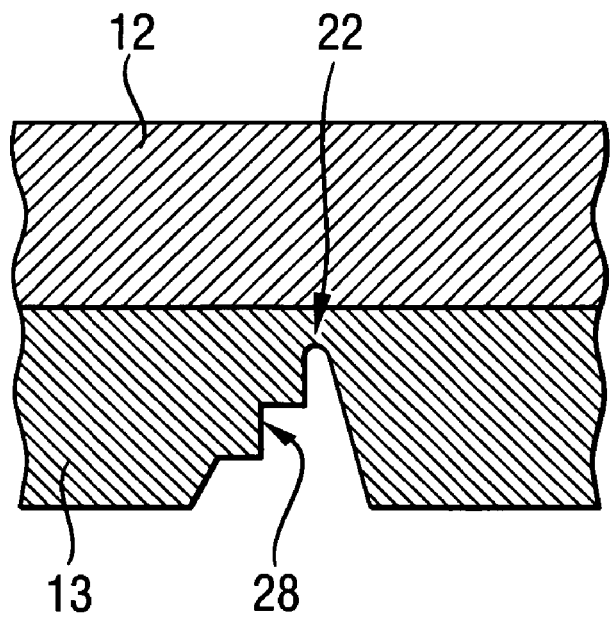
FIG. 3b a view similar to that of FIG. 3a of another embodiment.

Finally, as shown in FIG. 2c, in a separate process step, with the plunging die 26 which is displaced substantially perpendicular through stack 10, the smaller opening 23 is widened, and the material of the first workpiece 12 is drawn through the through-opening 15 of the second workpiece 13. In this embodiment, the free ends 19 of the drawn-through material project beyond the backside 21 of the second workpiece 13.

Figure 2D:
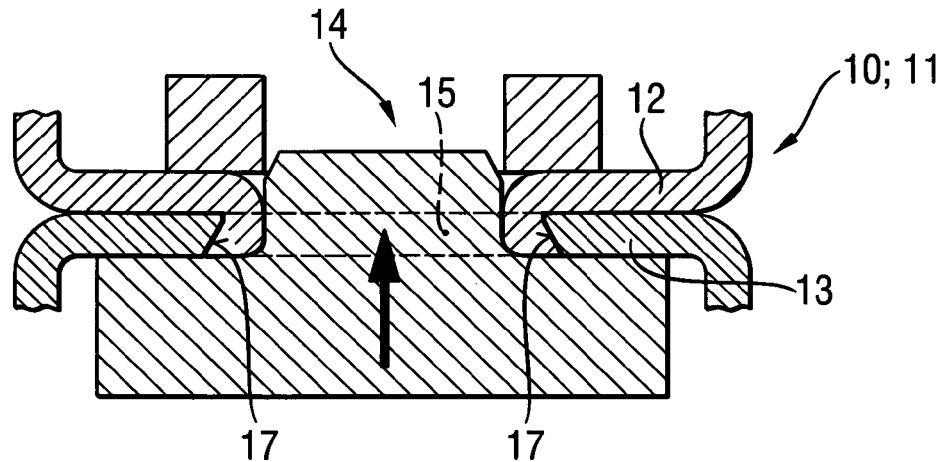

As shown in FIG. 2d, the projecting material of the eyelet 14 is deformed back, with the free space between the rim 17 of the through-opening 15 and the outer profile of the eyelet 14 being filled with the drawn-through material, whereby a flush with the surface, rivet joint is formed.

Figure 4:
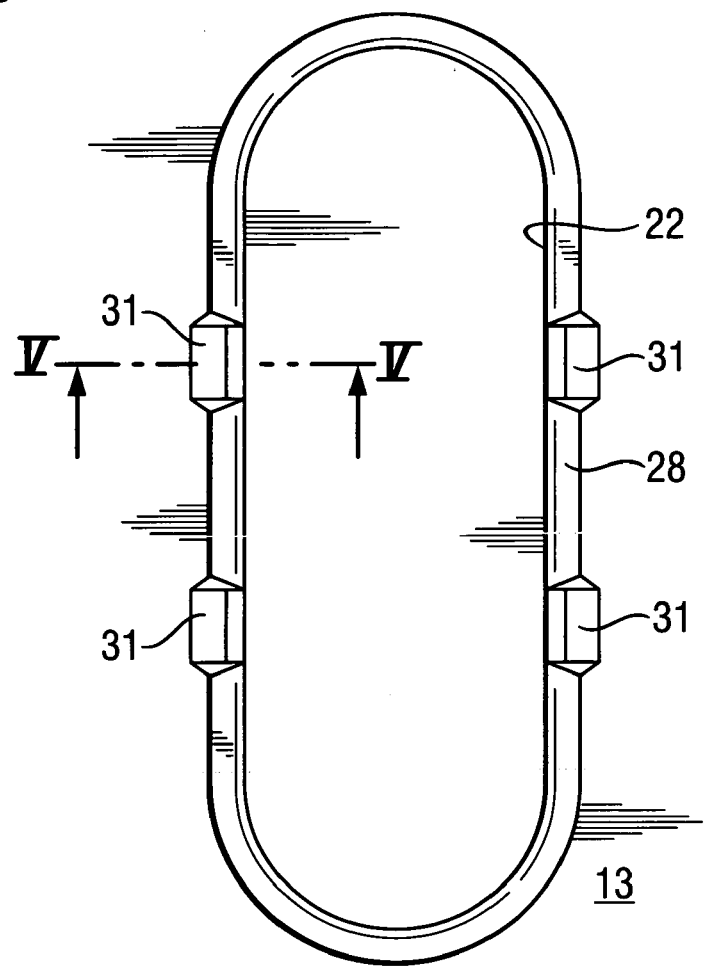
Figure 5:
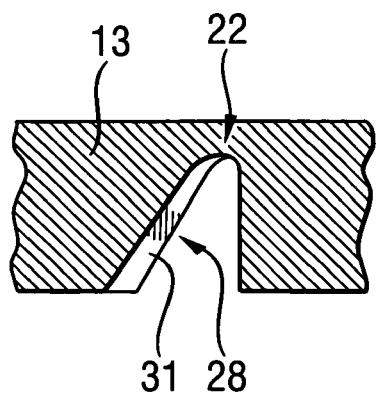
FIG. 5 a cross-sectional view along line V-V in FIG. 4 at an increased, in comparison with FIG. 4, scale.
Figure 6:
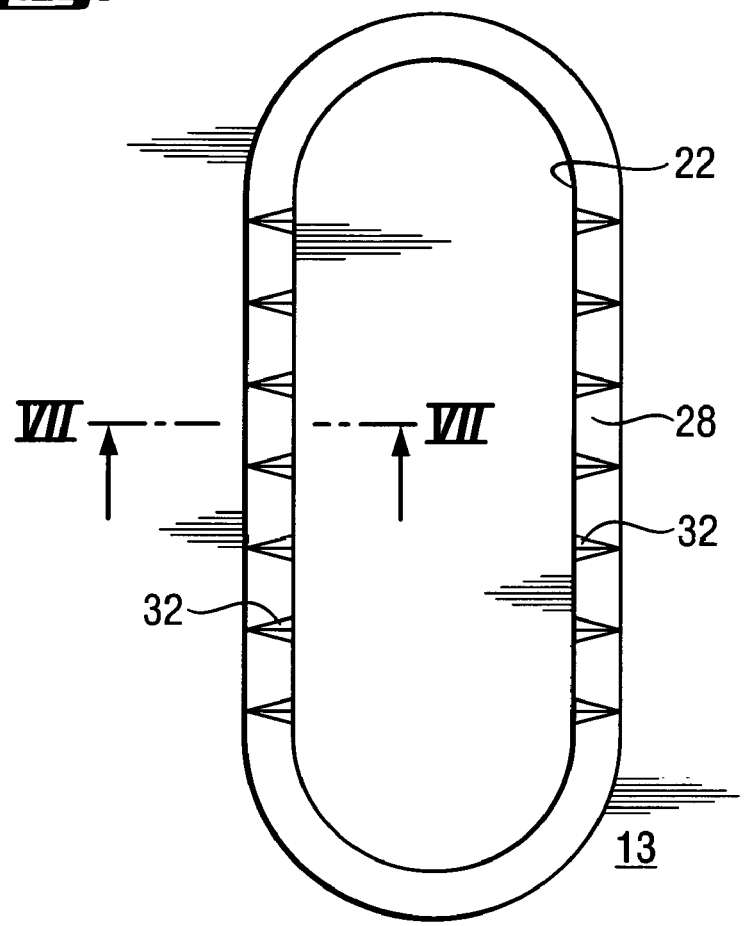
FIG. 6 a view of an embossing representing a variant of the embossing shown in FIG. 4.
Figure 7:
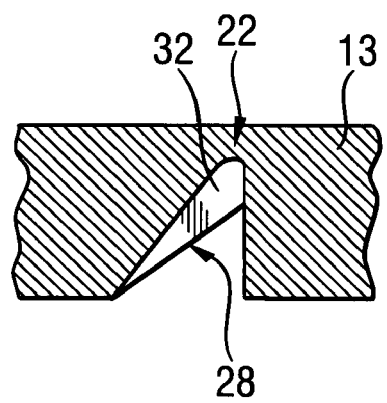
FIG. 7 a cross-sectional view along line VII-VII in FIG. 6 at an increased, in comparison with FIG. 6, scale.

FIGS. 4 and 5 show fracture zones 22 and the embossed zone 28 according to FIG. 2a which are provided regionwise with separate rectangular indentations 31. In FIGS. 6 and 7, alternatively to the rectangular indentations 31, there are provided projecting peaks or elevations 32.

Figure 8:
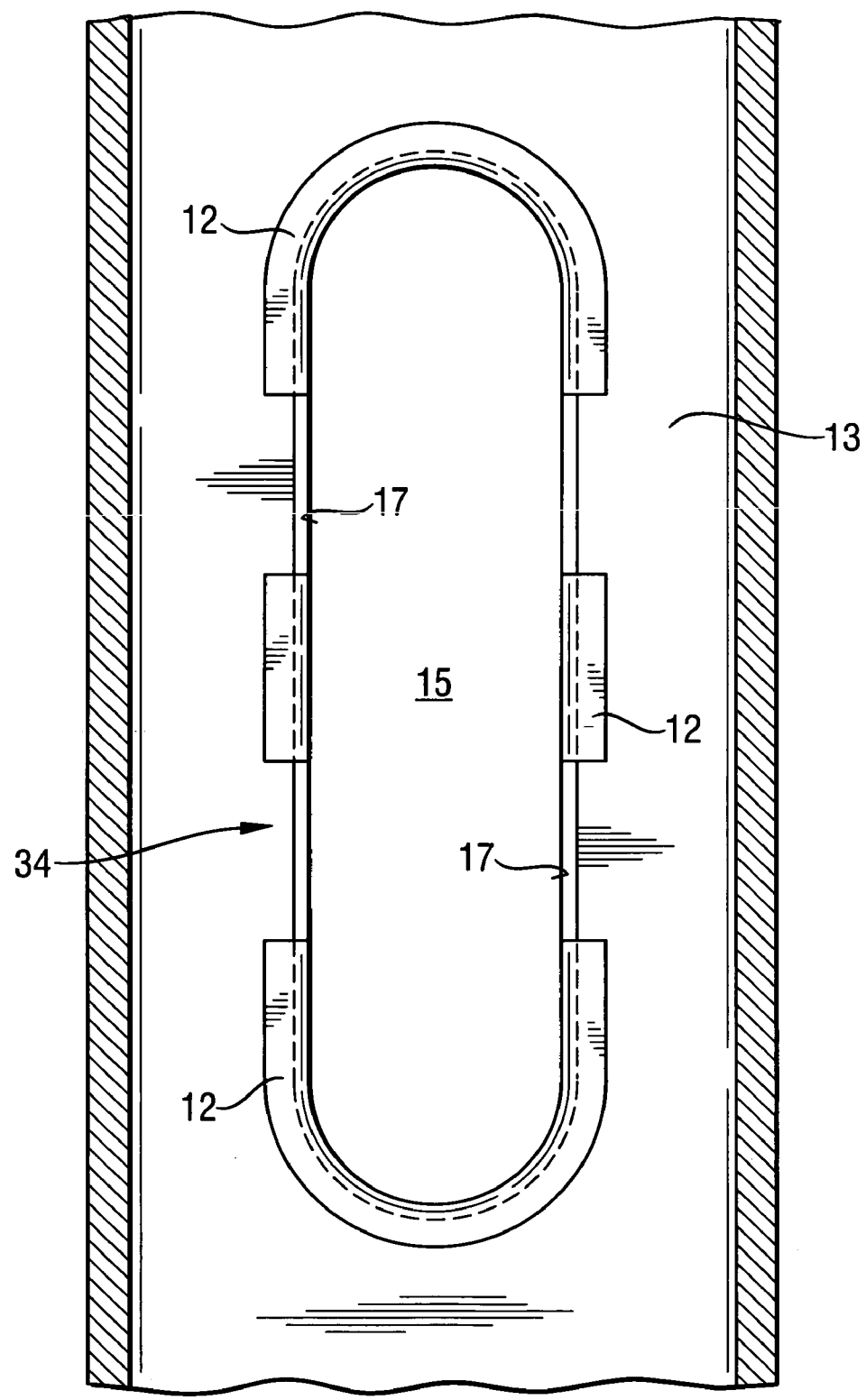
FIG. 8 a cross-sectional view of the produced eyelet viewed from plane VIII-VIII in FIG. 1.

FIG. 8 shows an eyelet 34 produced according to the inventive method with which only sections of the material of the first workpiece 12 were drawn through the through-opening 15 of the second workpiece 13.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A method of forming a connecting eyelet for a stack arrangement (11) having a first plate-shaped workpiece (12) and at least one another plate-shaped workpiece (13) following the first plate-shaped workpiece (12) the first plate-shaped workpiece (12) and the at least one another plate-shaped workpiece (13) being connectable by the eyelet (14; 34), the method comprising the steps of:

embossing a fracture zone (22) in the at least one another workpiece (13) at a backside thereof (21) remote from the first plate-shaped work-piece (12);

thereafter, forming with a piercing die (25), in a single movement, a through-opening (23) in the first workpiece (12) and a through-opening (15) in the at least one another workpiece (13), with the through-opening (23) in the first workpiece (12) having a cross-section smaller than a cross-section of the eyelet (14; 34) and with the through-opening (15) in the at least one another workpiece (13) having a cross-section greater than the cross-section of the eyelet (14; 34), the cross-section of the through-opening (15) in the at least one another workpiece being defined by the fracture zone (22);

finally, drawing, with a plunging die (26) displaceable through the stack (10) substantially perpendicular thereto, material of the first workpiece (12) through the through-opening (15) in the at least one another workpiece (13) for forming the connecting eyelet (14), with a free space, which is defined by a difference between the cross-section of the through-opening (23) in the first plate-shaped workpiece (12) and the cross-section of the through-opening (15) in the at least one another plate-shaped workpiece (13), being formed between a rim (17) of the through-opening (15) in the at least one another plate-shaped workpiece (13) and an outer profile of the connecting eyelet (14).

2. A method according to claim 1, wherein the fracture zone-forming step comprises forming the fracture zone (22) as a circumferential notch.

3. A method according to claim 2, wherein the fracture zone-forming step comprises forming the fracture zone (22) with at least one of indentations (31) and elevations (32).

4. A method according to claim 1, wherein formation of the fracture zone (22) is effected with a knife-edged ring.

5. A method according to claim 1, wherein formation of the fracture zone (22) is effected with a knife-edged ring having a stepped profile.

6. A method according to claim 1, wherein the through-opening forming step includes supporting the at least one another workpiece (13) with a stamp (24).

7. A method according to claim 1, wherein the drawing step comprises drawing the material of the first workpiece (12) through the through-opening (15) in the at least one another workpiece (13) only sectionwise.

8. A method according to claim 1, further comprising the step of back-forming free ends of the material drawn through the through-opening (15) of the at least one another workpiece (13).

* * * * *